United States Patent
Uchida et al.

(10) Patent No.: US 10,036,798 B1
(45) Date of Patent: Jul. 31, 2018

(54) POSITIONING APPARATUS AND POSITIONING METHOD

(71) Applicant: TOSHIBA TEC KABUSHIKI KAISHA, Shinagawa-ku, Tokyo (JP)

(72) Inventors: Shigeo Uchida, Shizuoka (JP); Akihiko Fujiwara, Kanagawa (JP); Mika Hirama, Tokyo (JP); Kazunori Hirabayashi, Kanagawa (JP); Koji Nagai, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/467,122

(22) Filed: Mar. 23, 2017

(51) Int. Cl.
*H04W 24/00* (2009.01)
*G01S 5/02* (2010.01)
*H04W 52/02* (2009.01)
*H04W 88/02* (2009.01)
*G01S 1/68* (2006.01)

(52) U.S. Cl.
CPC ....... *G01S 5/0242* (2013.01); *H04W 52/0229* (2013.01); *H04W 52/0274* (2013.01); *H04W 52/0287* (2013.01); *G01S 1/68* (2013.01); *H04W 88/02* (2013.01)

(58) Field of Classification Search
CPC .... G01S 5/0242; G01S 1/68; H04W 52/0274; H04W 52/0229; H04W 52/0287; H04W 88/02
See application file for complete search history.

(56) References Cited

U.S. PATENT DOCUMENTS

| | | | |
|---|---|---|---|
| 2003/0045304 A1* | 3/2003 | Shamoto | G01S 19/12 455/456.1 |
| 2005/0166054 A1* | 7/2005 | Fujimoto | H04N 19/51 713/176 |
| 2010/0272085 A1* | 10/2010 | Baier | G01S 5/0252 370/338 |
| 2013/0155896 A1* | 6/2013 | Lim | H04W 52/0206 370/252 |
| 2014/0355503 A1* | 12/2014 | Kainulainen | H04W 52/0206 370/311 |
| 2015/0204981 A1* | 7/2015 | Kong | G01S 19/24 342/357.63 |
| 2016/0334494 A1* | 11/2016 | Yamauchi | G01S 5/02 |

FOREIGN PATENT DOCUMENTS

| | | |
|---|---|---|
| JP | 2009-182867 | 8/2009 |
| JP | 2014-75711 | 4/2014 |
| JP | 2014075711 A * | 4/2014 |

* cited by examiner

*Primary Examiner* — Ajit Patel
(74) *Attorney, Agent, or Firm* — Amin, Turocy & Watson LLP

(57) ABSTRACT

In accordance with an embodiment, a positioning apparatus comprises a first interface and a processor. The first interface receives a positioning signal. The processor sets an interval for searching the positioning signal with a first interface to a first searching interval, sets the interval for searching the positioning signal to a second searching interval which is shorter than the first searching interval if it is determined that the positioning signal is received through searching in the first searching interval and uses the positioning signal received through searching in the second searching interval to specify a position of the positioning apparatus.

18 Claims, 7 Drawing Sheets

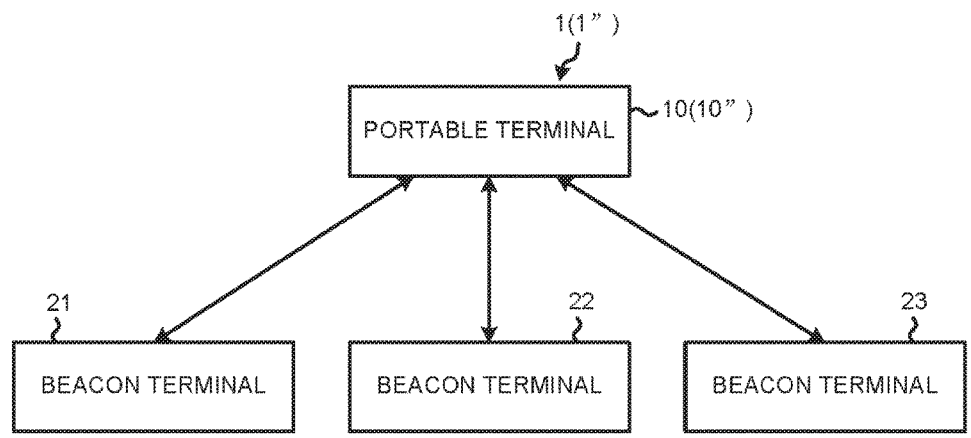
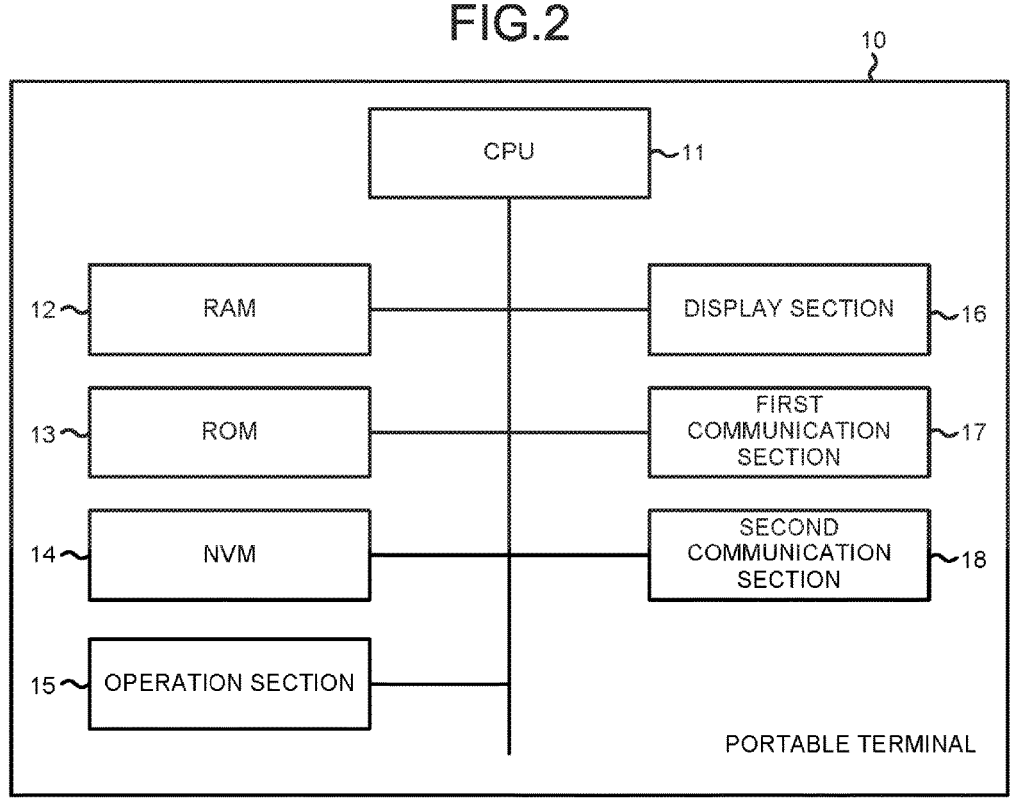

POSITIONING APPARATUS AND POSITIONING METHOD

FIELD

Embodiments described herein relate generally to a positioning apparatus and a positioning method.

BACKGROUND

There is a portable terminal such as a smart phone which receives a radio signal from a plurality of beacon terminals to specify a position of the portable terminal. For example, a plurality of beacon terminals is arranged in a predetermined area such as a predetermined building.

Conventionally, there is a problem that the portable terminal consumes much electric power to search a radio signal from a beacon terminal beyond a predetermined area.

DESCRIPTION OF THE DRAWINGS

FIG. 1 is a block diagram illustrating an example of the configuration of a positioning system according to a first embodiment;

FIG. 2 is a block diagram illustrating an example of the configuration of a positioning apparatus according to the first embodiment;

DETAILED DESCRIPTION

Figure 3:
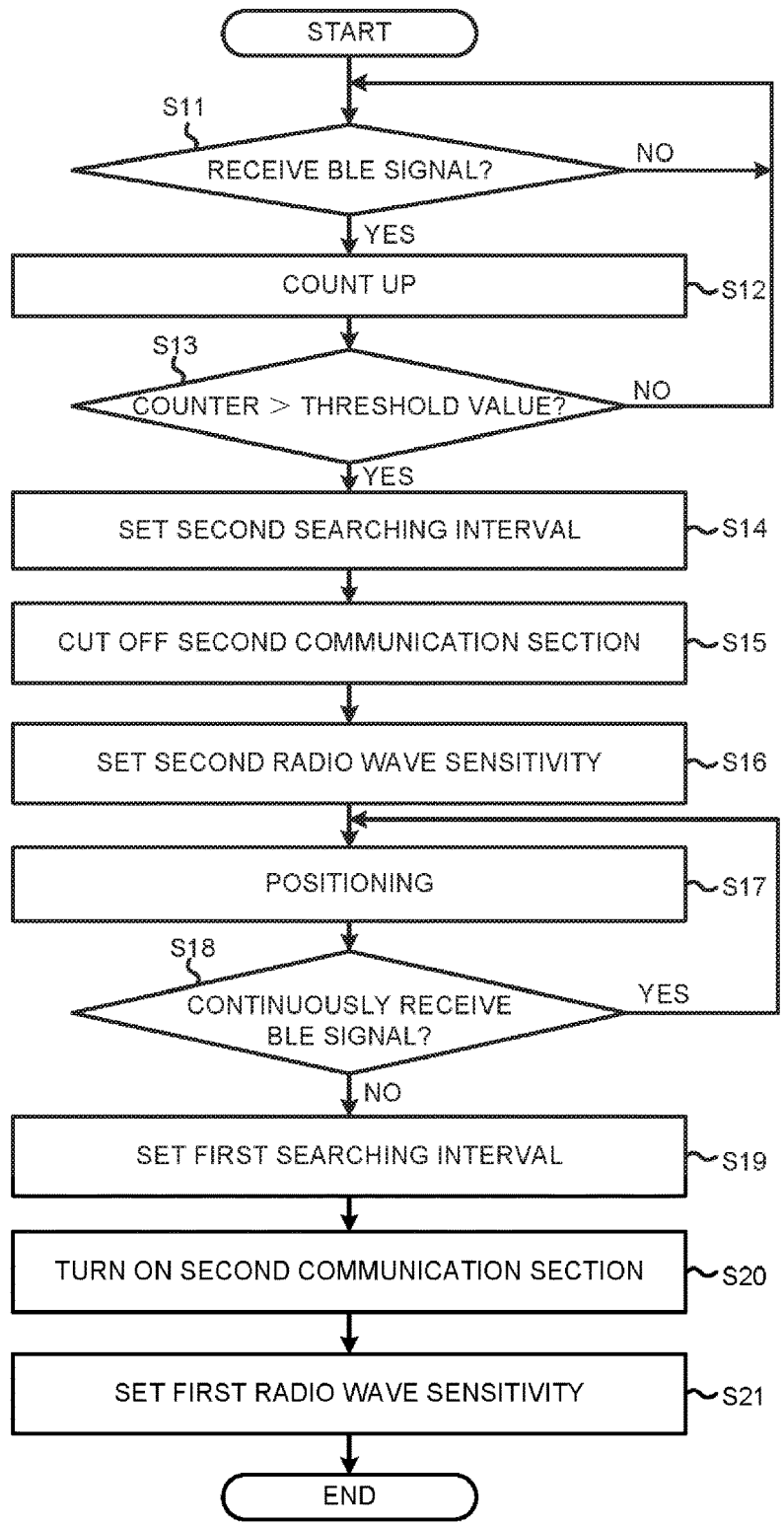
FIG. 3 is a flowchart illustrating an example of the operation of the positioning apparatus according to the first embodiment.

In accordance with an embodiment, a positioning apparatus comprises a first interface and a processor. The first interface receives a positioning signal. The processor sets an interval for searching the positioning signal with a first interface to a first searching interval, sets the interval for searching the positioning signal to a second searching interval which is shorter than the first searching interval if it is determined that the positioning signal is received through a searching in the first searching interval and uses the positioning signal received through the searching in the second searching interval to specify a position of the positioning apparatus.

Hereinafter, the embodiment is described with reference to the accompanying drawings.

First Embodiment

A positioning system according to the embodiment specifies a position of a portable terminal (positioning apparatus) in a predetermined area (positioning area). For example, the positioning system specifies the position of the portable terminal in a predetermined building or a predetermined site as the positioning area. The positioning system includes a plurality of beacon terminals. The positioning system specifies the position of the portable terminal on the basis of radio signals transmitted by the plurality of the beacon terminals.

FIG. 1 illustrates an example of the configuration of a positioning system 1 according to the embodiment.

As shown in FIG. 1, the positioning system 1 includes a portable terminal 10, a beacon terminal 21, a beacon terminal 22 and a beacon terminal 23.

The portable terminal 10 is a portable terminal carried by a user. The portable terminal 10 acquires a position of the portable terminal. For example, the portable terminal 10 presents the position of itself on a display section to the user. The portable terminal 10 is described in detail later.

The beacon terminal 21 transmits a positioning signal for positioning at a predetermined interval and a predetermined intensity. The beacon terminal 21 transmits the positioning signal by conforming to a predetermined communication standard. For example, the beacon terminal 21 transmits the positioning signal by conforming to a communication standard of a Bluetooth or a Wifi. Herein, the beacon terminal 21 transmits the positioning signal by conforming to a communication standard of Bluetooth.

The beacon terminal 21 is arranged at a predetermined position in the positioning area. For example, the beacon terminal 21 is arranged at the predetermined position in the predetermined building or the predetermined site as the positioning area.

The positioning signal stores information indicating the transmitted beacon terminal. For example, the positioning signal stores an ID of the beacon terminal. The positioning signal is a BLE (Bluetooth Low Energy) signal. For example, the configuration of the positioning signal is determined on the basis of a BLE specification. The positioning signal may be constituted in an area that can be freely set in the BLE specification. Furthermore, the configuration of the positioning signal is not particularly limited.

The beacon terminals 22 and 23 are arranged at positions different from the beacon terminal 21 in the positioning area. The configurations of the beacon terminals 22 and 23 are the same as the beacon terminal 21 and the description thereof is omitted.

The positioning system 1 includes three beacon terminals (beacon terminals 21, 22 and 23). The positioning system 1 may include four beacon terminals or more. The number of the beacon terminals in the positioning system 1 is not limited to a specified number.

Next, the portable terminal 10 is described.

FIG. 2 is a block diagram illustrating an example of the configuration of the portable terminal 10.

As shown in FIG. 2, the portable terminal 10 includes, as basic components, a CPU 11, a RAM 12, a ROM 13, a NVM 14, an operation section 15, a display section 16, a first communication section 17 and a second communication section 18. These sections are connected with each other via a data bus. Furthermore, the portable terminal 10 may include components other than those shown in FIG. 2 as necessary, or may exclude a specific component.

The CPU 11 (processor) has a function of controlling the operation of the whole portable terminal 10. The CPU 11 may be provided with an internal cache and various interfaces. The CPU 11 realizes various processing by executing programs stored in an internal memory, the ROM 13 or the NVM 14 in advance.

A part of the various functions realized through executing the programs by the CPU 11 may be realized through a hardware circuit. In this case, the CPU 11 controls functions executed through the hardware circuit.

The RAM 12 is a volatile memory and the RAM 12 temporarily stores data being processed by the CPU 11. The RAM 12 stores various application programs based on commands from the CPU 11. The RAM 12 may store data necessary for executing the application program and an execution result of the application program.

The ROM 13 is a nonvolatile memory in which a control program and control data are stored in advance. The control program and the control data stored in the ROM 13 are incorporated in advance according to specifications of the portable terminal 10. The ROM 13 stores a program (for example, BIOS) for controlling a circuit board of the portable terminal 10, for example.

The NVM 14 is a nonvolatile memory capable of writing and rewriting data. The NVM 14 is, for example, a hard disk, an SSD, an EEPROM® Technology or a flash memory. The NVM 14 stores a control program, an application and various data according to the application of the portable terminal 10.

In the operation section 15, various operation instructions are inputted by an operator of the portable terminal 10. The operation section 15 transmits a signal of an operation instruction inputted by the operator to the CPU 11. The operation section 15 is, for example, a keyboard, a numeric keypad, a touch panel and the like.

The display section 16 is a display device for displaying various information under the control of the CPU 11. The display section 16 is, for example, a liquid crystal monitor. If the operation section 15 is composed of a touch panel or the like, the display section 16 and the operation section 15 may be integrally formed.

The first communication section 17 is an interface for wirelessly receiving the positioning signals from the beacon terminals 21 to 23. The first communication section 17 is set to support Bluetooth communication.

The second communication section 18 is an interface for wirelessly transmitting and receiving data to and from other terminals. For example, the second communication section 18 transmits and receives data by using a frequency close to a communication frequency of the first communication section 17. For example, the second communication section 18 supports a communication standard different from that of the first communication section 17. For example, the second communication section 18 is an interface which supports Wifi communication.

Next, functions realized by the CPU 11 are described.

First, the CPU 11 has a function of searching a BLE signal from each beacon terminal according to a predetermined searching interval (first searching interval) and predetermined radio wave sensitivity (first radio wave sensitivity) through the first communication section 17.

For example, the CPU 11 searches the BLE signal at an interval from one second to several seconds as the first searching interval.

For example, the CPU 11 searches the BLE signal having the predetermined intensity. For example, the CPU 11 detects the intensity of the BLE signal through the first communication section 17. The CPU 11 succeeds in the searching of the BLE signal (in other words, the BLE signal is received) in a case in which the intensity of the BLE signal exceeds a threshold value (sensitivity threshold value) corresponding to the radio wave sensitivity (in other words, in a case in which the intensity of the BLE signal exceeds a predetermined intensity).

The intensity threshold value is used by the CPU 11 to determine that the searching of the BLE signal is successful if the intensity of the BLE signal exceeds the intensity threshold value.

The CPU 11 has a function of determining whether or not the portable terminal 10 enters the positioning area. The CPU 11 determines that the portable terminal 10 enters the positioning area if the BLE signal is received.

For example, the CPU 11 determines that the portable terminal 10 enters the positioning area in a case in which the BLE signal is received a predetermined number of times. For example, the CPU 11 counts up a counter for counting the number of times of reception if the BLE signal is detected. The CPU 11 determines that the portable terminal 10 enters the positioning area if a value of the counter exceeds a predetermined threshold value. Furthermore, the CPU 11 may determine that the portable terminal 10 enters the positioning area in a case in which the BLE signal is detected once.

If it is determined that the portable terminal 10 enters the positioning area, the CPU 11 has a function of setting the searching interval to the second searching interval shorter than the first searching interval.

For example, the CPU 11 changes the searching interval from the first searching interval (for example, 1~several s) to the second searching interval (for example, 200 m~500 ms). Furthermore, the second searching interval is not limited to a specific interval.

The CPU 11 has a function of cutting off the second communication section 18 if it is determined that the portable terminal 10 enters the positioning area.

For example, the CPU 11 cuts off electric power supplied to the second communication section 18. The CPU 11 may ignore a signal from the second communication section 18.

The CPU 11 has a function of setting a second radio wave sensitivity higher than the first radio wave sensitivity as the radio wave sensitivity of the first communication section 17 if it is determined that the portable terminal 10 enters the positioning area.

For example, the CPU 11 lowers the intensity threshold value. As a result, the CPU 11 can receive a BLE signal with weak intensity, and the radio wave sensitivity of the first communication section 17 is increased.

The CPU 11 has a function of acquiring the position of the portable terminal 10 on the basis of the BLE signal.

For example, the CPU 11 specifies the position of the portable terminal 10 with a three-point positioning method. For example, the NVM 14 stores an ID of each beacon terminal and the position of the beacon terminal in an associated manner. The CPU 11 acquires the position of the beacon terminal associated with the ID indicated by the received BLE signal. The CPU 11 detects the intensity of the received BLE signal. The CPU 11 calculates a distance from the position of the beacon terminal on the basis of the intensity of the received BLE signal.

The CPU 11 calculates the distance from each position of the three beacon terminals on the basis of three positioning signals. The CPU 11 specifies the position of the portable terminal 10 on the basis of the distance from each position of the three beacon terminals.

Furthermore, the CPU 11 may determine the position of the portable terminal 10 with a k-nearest neighbor algorithm. The method for specifying the position of the portable terminal 10 by the CPU 11 is not limited to a specific method.

The CPU 11 may enable an external device to specify the position of the portable terminal 10. For example, the CPU 11 transmits the ID stored in the received BLE signal and the intensity of the BLE signal in an associated manner to the external device. The external device specifies the position of the portable terminal 10 on the basis of the received information. The external device transmits the specified position to the portable terminal 10. The CPU 11 receives the position of the portable terminal 10 from the external device.

The CPU 11 has a function of determining whether or not the portable terminal 10 moves out of the positioning area. The CPU 11 determines that the portable terminal 10 moves out of the positioning area if the BLE signal is not received.

For example, the CPU 11 determines that the portable terminal 10 moves out of the positioning area in a case in which the BLE signal is not received in a predetermined time.

The CPU 11 has a function of setting the searching interval from the second searching interval to the first searching interval if it is determined that the portable terminal 10 moves out of the positioning area. In other words, the CPU 11 returns the searching interval to an initial searching interval.

The CPU 11 has a function of turning on the second communication section 18 if it is determined that the portable terminal 10 moves out of the positioning area.

The CPU 11 has a function of setting the radio wave sensitivity from the second radio wave sensitivity to the first radio wave sensitivity if it is determined that the portable terminal 10 moves out of the positioning area. In other words, the CPU 11 returns the radio wave sensitivity of the first communication section 17 to an initial state.

Next, an example of the operation of the CPU 11 is described.

FIG. 3 is a flowchart illustrating an example of the operation of the CPU 11. It is assumed that the second communication section 18 is turned on. The CPU 11 sets the first searching interval and the first radio wave sensitivity.

First, the CPU 11 determines whether or not the BLE signal is received through the first communication section 17 (ACT S11). If it is determined that the BLE signal is not received (No in ACT S11), the CPU 11 returns to the processing in ACT S11.

If it is determined that the BLE signal is received (Yes in ACT S11), the CPU 11 counts up the counter (ACT S12). If the counter is counted up, the CPU 11 determines whether or not the value of the counter exceeds the predetermined threshold value (ACT S13). If it is determined that the value of the counter does not exceed the predetermined threshold value (No in ACT S13), the CPU 11 returns to the processing in ACT S11.

If it is determined that the value of the counter exceeds the predetermined threshold value (Yes in ACT S13), the CPU 11 sets the second searching interval as the searching interval (ACT S14). If the second searching interval is set as the searching interval, the CPU 11 cuts off the second communication section 18 (ACT S15). If the second communication section 18 is cut off, the CPU 11 sets the second radio wave sensitivity as the radio wave sensitivity of the first communication section 17 (ACT S16).

If the second radio wave sensitivity is set as the radio wave sensitivity of the first communication section 17, the CPU 11 specifies the position of the portable terminal on the basis of the BLE signal (ACT S17). If the position of the portable terminal is determined, the CPU 11 determines whether or not the BLE signals are continuously received (ACT S18).

If it is determined that the BLE signals are continuously received (Yes in ACT S18), the CPU 11 returns to the processing in ACT S17. If it is determined that the BLE signals are not continuously received (in other words, not received in the predetermined time) (No in ACT S18), the CPU 11 sets the first searching interval as the searching interval (ACT S19).

If the first searching interval is set as the searching interval, the CPU 11 turns on the second communication section 18 (ACT S20). If the second communication section 18 is turned on, the CPU 11 sets the first radio wave sensitivity as the radio wave sensitivity of the first communication section 17 (ACT S21) If the first radio wave sensitivity is set as the radio wave sensitivity of the first communication section 17, the CPU 11 terminates the operations.

Furthermore, the CPU 11 may execute the processing in ACT S14 to ACT S16 in a different order. The CPU 11 may execute the processing in ACT S19 to ACT S21 in a different order. If the second communication section 18 is cut off at the initial state, the CPU 11 may not execute the processing in ACT S15 and ACT S20.

The portable terminal with the foregoing constitution, in a case in which the BLE signal is not received, the searching interval of the BLE is set to a wide range. The portable terminal reduces the searching interval of the BLE signal if the BLE signal is received.

As a result, in a case in which the portable terminal is not located in the positioning area, the searching interval can be widened and the consumed power can be saved. The portable terminal receives the BLE signal at a short interval in a case of entering the positioning area to be capable of accurately specifying the position of the portable terminal.

If receiving the BLE signal, the portable terminal cuts off the second communication section. As a result, the portable terminal can prevent interference with the BLE signal from being generated by the second communication section in the positioning area. The portable terminal can accurately receive the BLE signal. The portable terminal can save the consumed power through cutting off the second communication section.

If receiving the BLE signal, the portable terminal increases the sensitivity at which the BLE signal is received. As a result, the portable terminal can receive more BLE signals. For example, in a case of executing three-point positioning, the portable terminal specifies the position of itself on the basis of three or more BLE signals. If the portable terminal carries out positioning by using the BLE signals corresponding to a middle vale and preceding and succeeding values of the intensity of the received BLE signal, the accuracy of the positioning is further improved. Through receiving more BLE signals, the portable terminal can improve the accuracy of the positioning.

Second Embodiment

Next, the positioning system according to the second embodiment is described.

The positioning system according to the second embodiment is different from the positioning system of the first embodiment in the point that the CPU 11 determines that the portable terminal enters the positioning area if a BLE signal from a specific beacon terminal is received. Other components are assigned with the same numerals as those in the first embodiment, and thus, the detailed description thereof is omitted.

Figure 4:
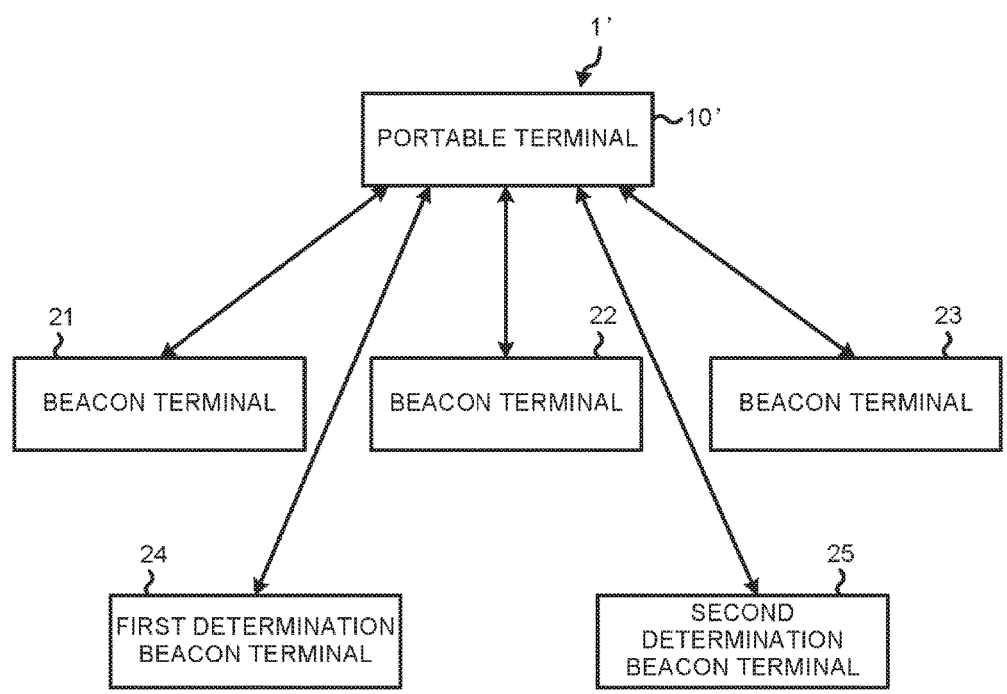
FIG. 4 is a block diagram illustrating an example of the configuration of a positioning system according to a second embodiment.

FIG. 4 is a block diagram illustrating an example of the configuration of a positioning system 1' according to the second embodiment.

As shown in FIG. 4, the positioning system 1' may include a first determination beacon terminal 24 (first terminal) and a second determination beacon terminal 25 (second terminal) in addition to the components of the positioning system 1 according to the first embodiment.

The first determination beacon terminal 24 transmits a BLE signal indicating that the portable terminal enters the positioning area. For example, the first determination beacon terminal 24 transmits a BLE signal for determining that the portable terminal 10 enters the positioning area to the portable terminal 10. For example, the first determination beacon terminal 24 transmits the BLE signal indicating an ID of the first determination beacon terminal 24 itself. Furthermore, the first determination beacon terminal 24 may transmit the BLE signal storing information indicating that the portable terminal enters the positioning area.

The first determination beacon terminal 24 may transmit a BLE signal at intensity higher than intensity at which the beacon terminals 21 to 23 output the BLE signals, or may transmit a BLE signal at weak intensity.

For example, the first determination beacon terminal 24 is arranged at a boundary or an entrance of the positioning area.

The second determination beacon terminal 25 transmits the BLE signal indicating that the portable terminal moves out of the positioning area. The second determination beacon terminal 25 transmits a BLE signal for determining that the portable terminal 10 moves out of the positioning area to the portable terminal 10. For example, the second determination beacon terminal 25 transmits a BLE signal indicating an ID of the second determination beacon terminal 25 itself. Furthermore, the second determination beacon terminal 25 may transmit the BLE signal storing information indicating that the portable terminal moves out of the positioning area.

The second determination beacon terminal 25 may transmit a BLE signal with intensity higher than intensity at which the beacon terminals 21 to 23 output the BLE signals, or may transmit a BLE signal at weak intensity.

For example, the second determination beacon terminal 25 is arranged at an exit of the positioning area.

Furthermore, the positioning system 1' may include a plurality of the first determination beacon terminals 24. The positioning system 1' may include a plurality of the second determination beacon terminals 25.

Next, the functions realized by the CPU 11 are described in detail.

First, the CPU 11 has a function of determining that the portable terminal 10 enters the positioning area in a case of receiving the BLE signal from the first determination beacon terminal 24.

For example, the CPU 11 determines that the portable terminal 10 enters the positioning area in a case in which the BLE signal is received a predetermined number of times from the first determination beacon terminal 24.

For example, the CPU 11 receives the BLE signal through the first communication section 17. If receiving the BLE signal, the CPU 11 determines whether or not the ID indicated by the BLE signal is the ID of the first determination beacon terminal 24. The CPU 11 counts up the counter for counting the number of times of reception if it is determined that the ID indicated by the BLE signal is the ID of the first determination beacon terminal 24.

The CPU 11 determines that the portable terminal 10 enters the positioning area if the value of the counter exceeds the predetermined threshold value. Furthermore, the CPU 11 may determine that the portable terminal 10 enters the positioning area in a case in which the BLE signal from the first determination beacon terminal 24 is detected once.

The CPU 11 has a function of determining that the portable terminal 10 moves out of the positioning area in a case of receiving the BLE signal from the second determination beacon terminal 25.

For example, the CPU 11 receives the BLE signal through the first communication section 17. If receiving the BLE signal, the CPU 11 determines whether or not the ID indicated by the BLE signal is the ID of the second determination beacon terminal 25. If it is determined that the ID indicated by the BLE signal is the ID of the second determination beacon terminal 25, the CPU 11 determines that the portable terminal 10 moves out of the positioning area.

Furthermore, the CPU 11 may specify the position of the portable terminal on the basis of the BLE signal from the first determination beacon terminal 24 or the second determination beacon terminal 25. The CPU 11 may not use the BLE signal from the first determination beacon terminal 24 or the second determination beacon terminal 25 to specify the position.

Next, an example of the operation of the CPU 11 is described.

Figure 5:
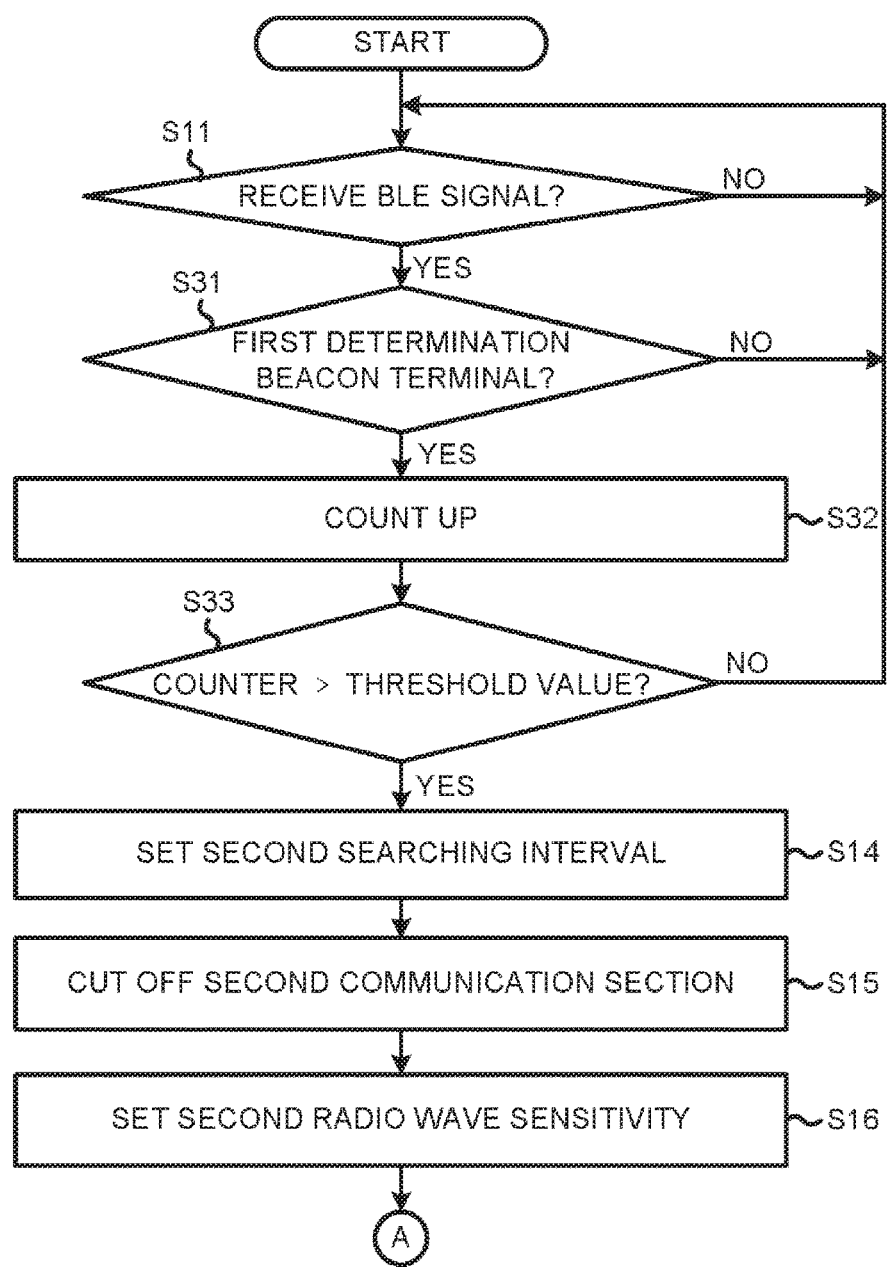
FIG. 5 is a flowchart illustrating an example of the operation of a positioning apparatus according to the second embodiment.
Figure 6:
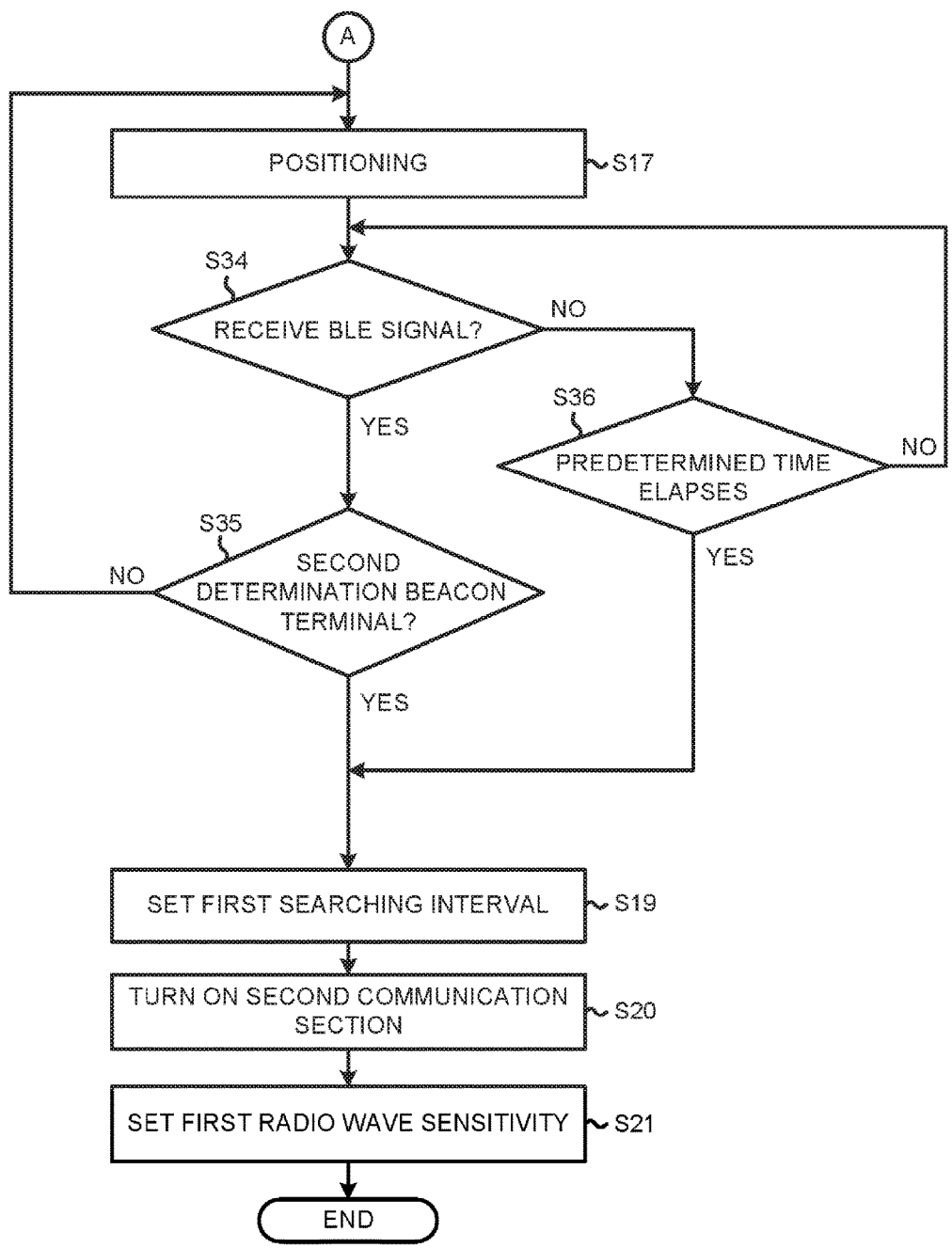
FIG. 6 is a flowchart illustrating an example of the operation of the positioning apparatus according to the second embodiment.

FIG. 5 and FIG. 6 are flowcharts illustrating an example of the operation of the CPU 11.

The blocks same as operations in FIG. 3 are assigned with the same numerals, and thus the detailed description thereof is not described.

First, the CPU 11 determines whether or not the BLE signal is received through the first communication section 17 (ACT S11) If it is determined that the BLE signal is received (Yes in ACT S11), the CPU 11 determines whether or not the received BLE signal is the BLE signal received from the first determination beacon terminal 24 (ACT S31).

If it is determined that the received BLE signal is not the BLE signal received from the first determination beacon terminal 24 (No in ACT S31), the CPU 11 returns to the processing in ACT S11.

If it is determined that the received BLE signal is the BLE signal received from the first determination beacon terminal 24 (Yes in ACT S31), the CPU 11 counts up the counter (ACT S32).

If the counter is counted up, the CPU 11 determines whether or not the value of the counter exceeds the predetermined threshold value (ACT S33). If it is determined that the value of the counter does not exceed the predetermined threshold value (No in ACT S33), the CPU 11 returns to the processing in ACT S11.

If it is determined that the value of the counter exceeds the predetermined threshold value (Yes in ACT S33), the CPU 11 proceeds to the processing in ACT S14.

If the position of the portable terminal is specified on the basis of the BLE signal (ACT S17), the CPU 11 determines whether or not the BLE signal is received through the first communication section 17 (ACT S34). If it is determined that the BLE signal is received (Yes in ACT S34), the CPU 11 determines whether or not the received BLE signal is the BLE signal received from the second determination beacon terminal 25 (ACT S35).

If it is determined that the received BLE signal is not the BLE signal received from the second determination beacon terminal 25 (No in ACT S35), the CPU 11 returns to the processing in ACT S17.

If it is determined that the received BLE signal is the BLE signal received from the second determination beacon terminal 25 (Yes in ACT S35), the CPU 11 proceeds to the processing in ACT S19.

If it is determined that the BLE signal is not received through the first communication section 17 (No in ACT S34), the CPU 11 determines whether or not a predetermined time elapses since the BLE signal is received (ACT S36). If it is determined that the predetermined time elapses since the BLE signal is received (Yes in ACT S36), the CPU 11 proceeds to the processing in ACT S19.

If it is determined that the predetermined time does not elapse since the BLE signal is received (No in ACT S36), the CPU 11 proceeds to the processing in ACT S34.

Furthermore, the CPU 11 may proceed to the processing in ACT S19 if the BLE signal from the second determination beacon terminal 25 is received a predetermined number of times.

The first determination beacon terminal 24 and the second determination beacon terminal 25 may be identical beacon terminal.

The portable terminal with the foregoing constitution determines that the portable terminal enters the positioning area if receiving the BLE signal from a predetermined beacon terminal. The portable terminal determines that the portable terminal moves out of the positioning area if the BLE signal is received from another predetermined beacon terminal. As a result, the portable terminal can determine that the portable terminal enters the positioning area or moves out of the positioning area more accurately.

Through strengthening the intensity of the predetermined beacon terminal, the portable terminal can determine that the portable terminal enters the positioning area from a further position.

Third Embodiment

Next, the third embodiment is described.

The positioning system according to the third embodiment is different from the positioning system 1 of the first embodiment in the point that the CPU 11 sets the second searching interval if the portable terminal 10 moves. Other components are assigned with the same numerals as the first embodiment, and thus, the detailed description thereof is omitted.

FIG. 1 is a block diagram illustrating an example of the configuration of a positioning system 1" according to the third embodiment. As shown in FIG. 1, the positioning system 1" includes a portable terminal 10", the beacon terminal 21, the beacon terminal 22 and the beacon terminal 23.

The portable terminal 10" is described.

Figure 7:
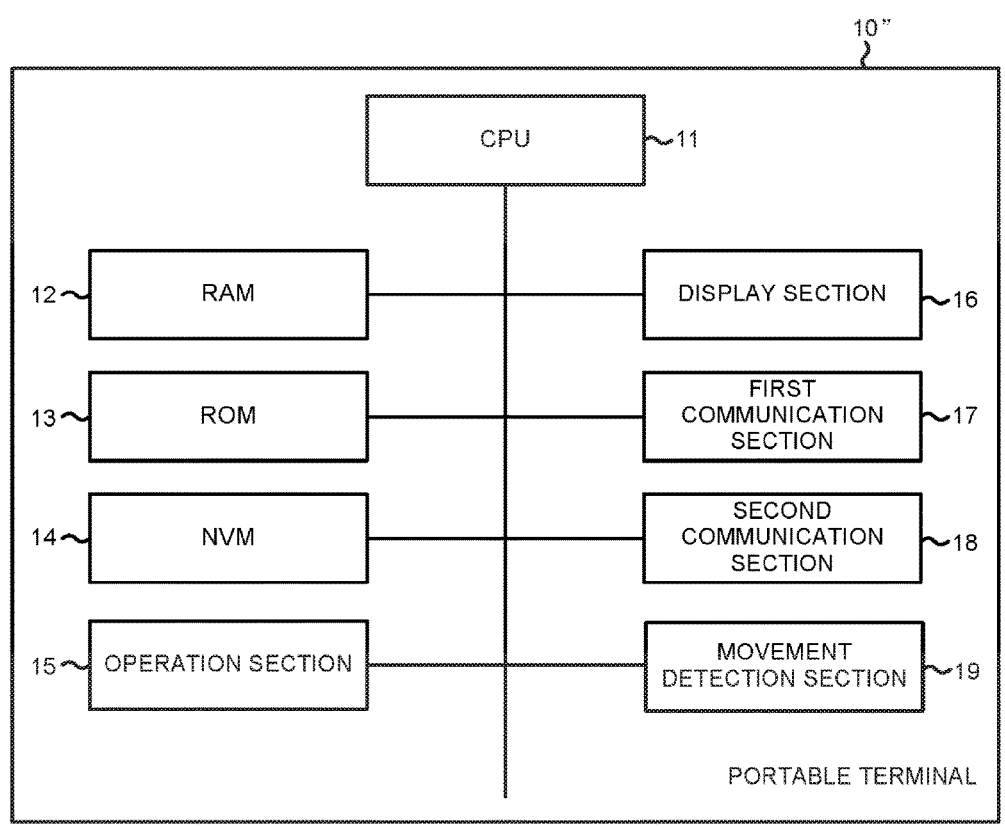
FIG. 7 is a block diagram illustrating an example of the configuration of a positioning apparatus according to a third embodiment.

FIG. 7 is a block diagram illustrating an example of the configuration of the portable terminal 10" As shown in FIG. 7, the portable terminal 10" includes, as basic components, the CPU 11, the RAM 12, the ROM 13, the NVM 14, the operation section 15, the display section 16, the first communication section 17, the second communication section 18 and a movement detection section 19. These sections are connected with each other via a data bus. Furthermore, the portable terminal 10" may include components other than those shown in FIG. 7 as necessary, or may exclude a specific component.

The movement detection section 19 detects the movement of the portable terminal 10". In other words, the movement detection section 19 detects movement of a user carrying the portable terminal 10". For example, the movement detection section 19 is an acceleration sensor. The movement detection section 19 transmits the movement of the portable terminal 10" to the CPU 11.

The CPU 11 has a function of determining whether or not the portable terminal 10" moves through the movement detection section 19.

For example, the CPU 11 determines that the portable terminal 10" moves on the basis of a signal from the movement detection section 19 in a case in which the portable terminal 10" moves at a predetermined distance or for a predetermined time.

The CPU 11 has a function of setting the searching interval to the second searching interval shorter than the first searching interval if it is determined that the portable terminal 10" moves.

The CPU 11 has a function of cutting off the second communication section 18 if it is determined that the portable terminal 10" moves.

The CPU 11 has a function of setting the second radio wave sensitivity higher than the first radio wave sensitivity as the radio wave sensitivity of the first communication section 17 if it is determined that the portable terminal 10" moves.

The CPU 11 has a function of determining whether or not the portable terminal 10" stops on the basis of the signal from the movement detection section 19.

For example, the CPU 11 determines that the portable terminal 10" stops if it is determined that the portable terminal 10" does not move in a predetermined period on the basis of the signal from the movement detection section 19. The CPU 11 may determine that the portable terminal 10" stops in a case in which the movement of the portable terminal 10" is smaller than a predetermined threshold value in a predetermined period.

The CPU 11 has a function of setting the searching interval from the second searching interval to the first searching interval if it is determined that the portable terminal 10" stops. In other words, the CPU 11 returns the searching interval to the initial searching interval.

The CPU 11 has a function of turning on the second communication section 18 if it is determined that the portable terminal 10" stops.

The CPU 11 has a function of setting the radio wave sensitivity from the second radio wave sensitivity to the first radio wave sensitivity if it is determined that the portable terminal 10" stops. In other words, the CPU 11 returns the radio wave sensitivity of the first communication section 17 to the initial state.

Next, an example of the operation of the CPU 11 is described.

Figure 8:
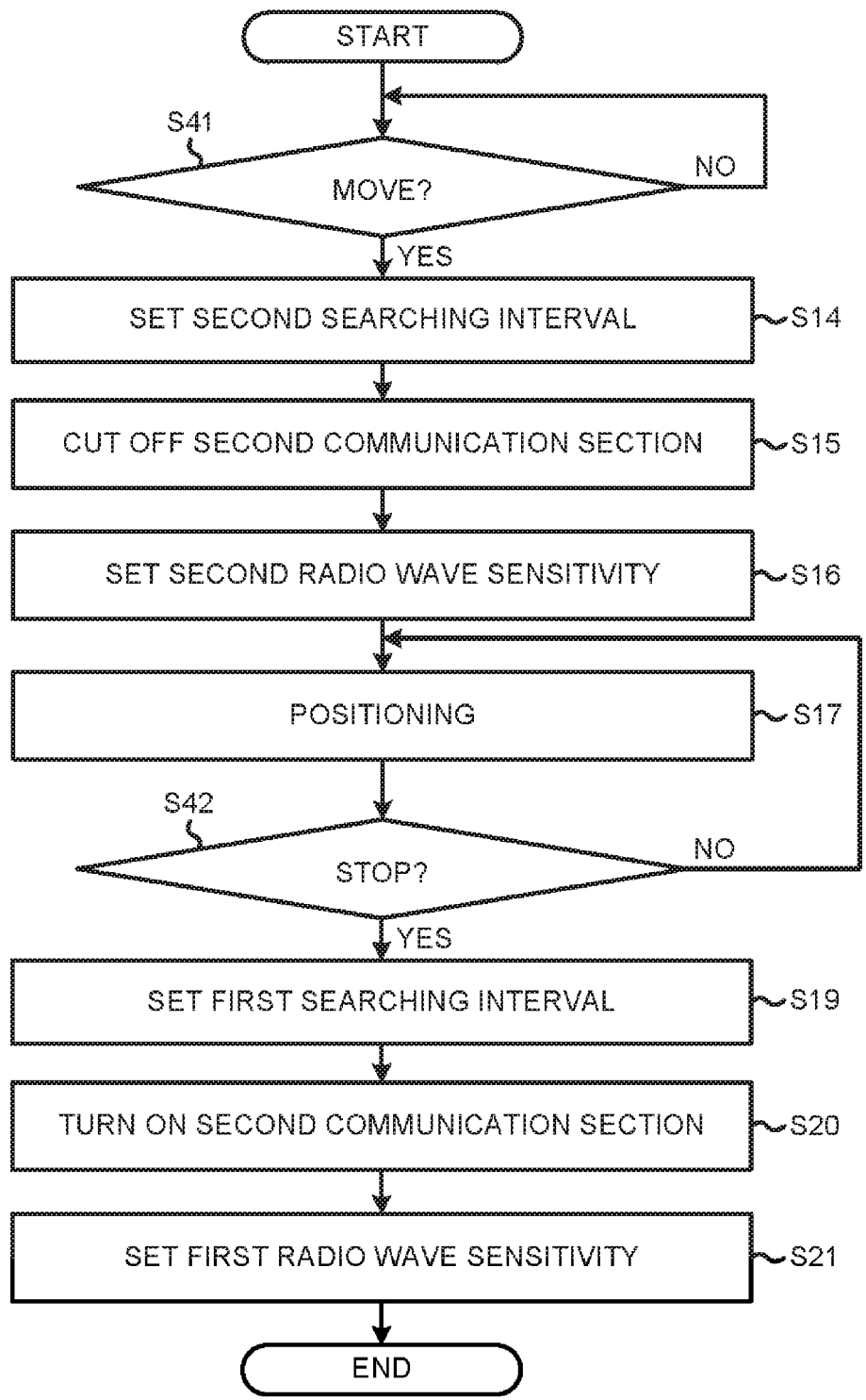
FIG. 8 is a flowchart illustrating an example of the operation of the positioning apparatus according to the third embodiment.

FIG. 8 is a flowchart illustrating an example of the operation of the CPU 11.

Herein, the portable terminal 10" is located in the positioning area.

The blocks same as operations in FIG. 3 are assigned with the same numerals, and thus the detailed description thereof is not described.

The CPU 11 determines whether or not the portable terminal 10" moves through the movement detection section 19 (ACT S41). If it is determined that the portable terminal 10" does not move (No in ACT S41), the CPU 11 returns to the processing in ACT S41.

If it is determined that the portable terminal 10" moves (Yes in ACT S41), the CPU 11 proceeds to the processing in ACT S14.

If the position of the portable terminal is specified on the basis of the BLE signal (ACT S17), the CPU 11 determines whether or not the portable terminal 10" stops through the movement detection section 19 (ACT S42). If it is determined that the portable terminal 10" does not stop (No in ACT S42), the CPU 11 returns to the processing in ACT S17.

If it is determined that the portable terminal 10" stops (Yes in ACT S42), the CPU 11 proceeds to the processing in ACT S19.

Furthermore, the positioning system 1" may have characteristics of the positioning system 1 according to the first embodiment or the positioning system 1' according to the second embodiment.

The portable terminal with the foregoing constitution sets the second searching interval and the second reception sensitivity and cuts off the second communication section if the portable terminal moves. As a result, the portable terminal can improve accuracy of the positioning in a case in which the user moves and accurate positioning is necessary.

The portable terminal returns to the initial state if the portable terminal stops. As a result, the portable terminal can save the consumed power in a case in which the user stops and accurate positioning is not necessary.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A positioning apparatus comprising:
    a first interface configured to receive a positioning signal; and
    a processor configured to:
        set an interval for searching the positioning signal with the first interface to a first searching interval,
        determine whether or not a positioning signal indicating that the positioning apparatus enters a positioning area based on searching at the first searching interval through the first interface is received;
        set the interval for searching the positioning signal to a second searching interval which is shorter than the first searching interval if the positioning signal is received through searching in the first searching interval, and
        use the positioning signal received through searching in the second searching interval to specify a position of the positioning apparatus.

2. The positioning apparatus according to claim 1, further comprising:
    a second interface configured to receive and transmit a signal different from the positioning signal, wherein
    the processor cuts off the second interface if the positioning signal is received.

3. The positioning apparatus according to claim 1, wherein
    the processor searches the positioning signal at a first radio wave sensitivity and sets a second radio wave sensitivity higher than the first radio wave sensitivity if the positioning signal is received.

4. The positioning apparatus according to claim 1, wherein
    the processor determines that the positioning signal is received when the positioning signal is received through the first interface at the first searching interval a predetermined number of times.

5. The positioning apparatus according to claim 1, wherein
    the processor sets the interval for searching the positioning signal to the first searching interval when the positioning signal is not received in a predetermined period in which the second searching interval is set.

6. The positioning apparatus according to claim 1, wherein
    the processor determines whether or not the positioning signal indicating the positioning apparatus moves out of the positioning area is received and sets the interval for searching the positioning signal to the first searching interval if the positioning signal is received.

7. The positioning apparatus according to claim 1, wherein the positioning signal comprises an ID of a beacon terminal.

8. The positioning apparatus according to claim 1, wherein the first interface receives the positioning signal in a wireless manner.

9. A positioning apparatus, comprising:
    an interface configured to receive a positioning signal;
    a movement detection section configured to detect movement of the positioning apparatus; and
    a processor configured to:
        set an interval for searching the positioning signal with the interface to a first searching interval and a first radio wave sensitivity,
        determine whether or not the positioning apparatus moves through a positioning area,
        set the interval for searching the positioning signal to a second searching interval which is shorter than the first searching interval and a second radio wave sensitivity higher than the first radio wave sensitivity if the positioning apparatus moves, and
        use the positioning signal received through searching in the second searching interval to specify a position of the positioning apparatus.

10. A positioning method for specifying a position of a positioning apparatus, comprising:
    setting an interval for searching a positioning signal with a first interface to a first searching interval;
    determining whether or not the positioning signal indicating the positioning apparatus enters a positioning area through searching the first searching interval through the first interface is received;
    setting the interval for searching the positioning signal to a second searching interval which is shorter than the first searching interval if the positioning signal is received through searching in the first searching interval; and
    using the positioning signal received through searching in the second searching interval to specify the position of the positioning apparatus.

11. The positioning method according to claim 10, further comprising:
    receiving and transmitting a signal different from the positioning signal with a second interface; and
    cutting off the second interface if the positioning signal is received.

12. The positioning method according to claim 10, further comprising:
searching the positioning signal at a first radio wave sensitivity and setting a second radio wave sensitivity higher than the first radio wave sensitivity if the positioning signal is received.

13. The positioning method according to claim 10, further comprising:
determining that the positioning signal is received when the positioning signal is received through the first interface at the first searching interval a predetermined number of times.

14. The positioning method according to claim 10, further comprising:
setting the interval for searching the positioning signal to the first searching interval when the positioning signal is not received in a predetermined period in which the second searching interval is set.

15. The positioning method according to claim 10, further comprising:
determining whether or not the positioning signal indicating the positioning apparatus moves out of the positioning area is received and setting the interval for searching the positioning signal to the first searching interval if the positioning signal is received.

16. The positioning method according to claim 10, wherein the positioning signal comprises an ID of a beacon terminal.

17. The positioning method according to claim 10, wherein the first interface receives the positioning signal wirelessly.

18. A positioning method for specifying a position of a positioning apparatus, comprising:
setting an interval for searching a positioning signal with a first interface to a first searching interval and a first radio wave sensitivity;
determining whether or not the positioning apparatus moves through a predetermined area;
setting the interval for searching the positioning signal to a second searching interval which is shorter than the first searching interval and a second radio wave sensitivity higher than the first radio wave sensitivity if the positioning apparatus moves; and
using the positioning signal received through searching in the second searching interval to specify the position of the positioning apparatus.

\* \* \* \* \*